D. MILLAR.
TIRE.
APPLICATION FILED MAR. 15, 1917.

1,252,921.

Patented Jan. 8, 1918.
2 SHEETS—SHEET 1.

WITNESSES:
Harry A. Benner
Jos. A. Michel

INVENTOR.
David Millar.
BY
Emil Stasek
ATTORNEY.

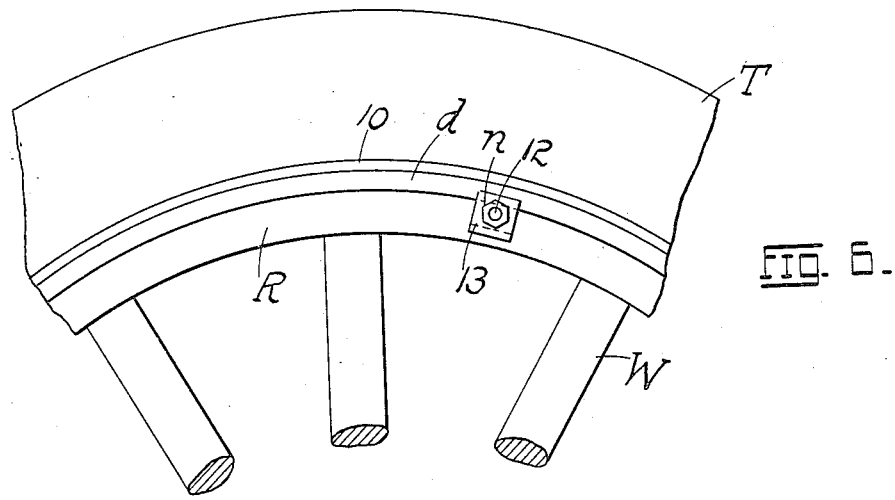
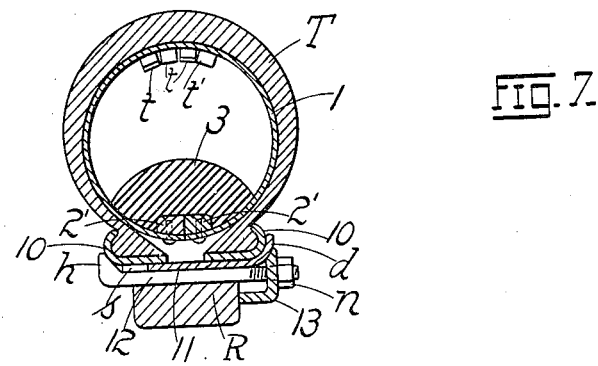
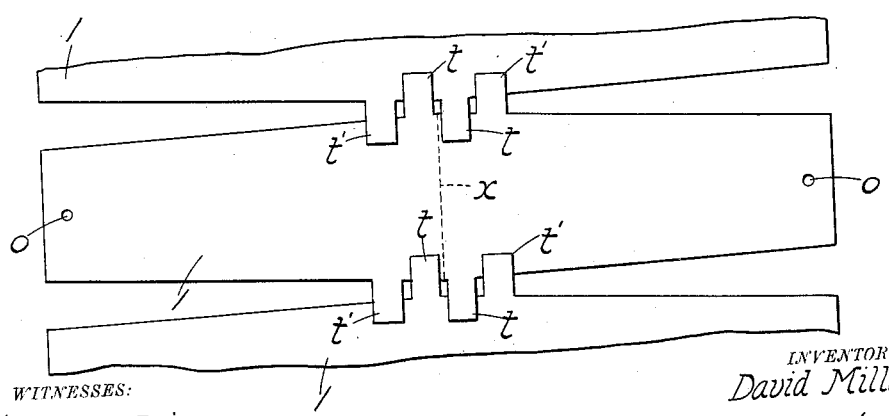

UNITED STATES PATENT OFFICE.

DAVID MILLAR, OF ST. LOUIS, MISSOURI.

TIRE.

1,252,921.    Specification of Letters Patent.    Patented Jan. 8, 1918.

Application filed March 15, 1917. Serial No. 154,975.

*To all whom it may concern:*

Be it known that I, DAVID MILLAR, a subject of the King of England, residing at St. Louis, State of Missouri, have invented certain new and useful Improvements in Tires, of which the following is a full, clear, and exact description, reference being had to the accompanying drawings, forming a part hereof.

My invention has relation to improvements in tires; and it consists in the novel features of construction more fully set forth in the specification and pointed out in the claims.

The object of my invention is to dispense with the usual inner inflatable tube or sack of pneumatic tires and substitute in lieu thereof a resilient metallic cushioning filler in the shape of a metallic or equivalent jointed tube composed of a series of sections in hinged relation, the joints between the sections being disposed in radial planes intersecting along the rotation axis of the wheel to which the tire is applied. A further object is to so unite the sections as to produce an articulated tubular cushioning member or filler which will readily respond to variable load conditions, and to sudden blows resulting from the passage of the wheel over irregular surfaces such as rocks, stones, and the like, said response being akin to that characterizing the prevailing pneumatic tire. The tire is susceptible of considerable modification without a departure from the spirit of the invention, the latter possessing advantages which will be clearly and fully apparent from the following detailed description in connection with the accompanying drawings in which—

Figure 1:
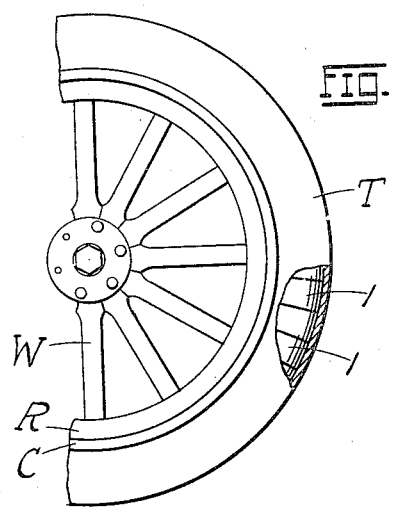
Figure 2:
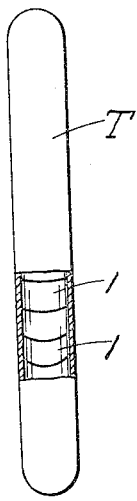
Figure 3:
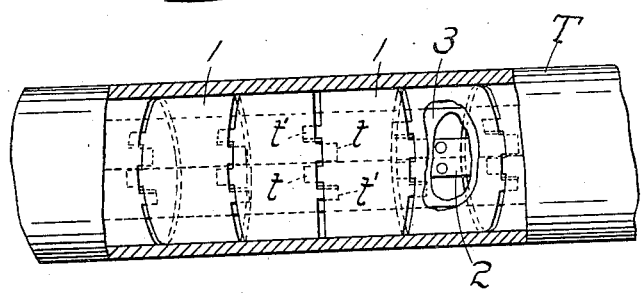
Figure 4:
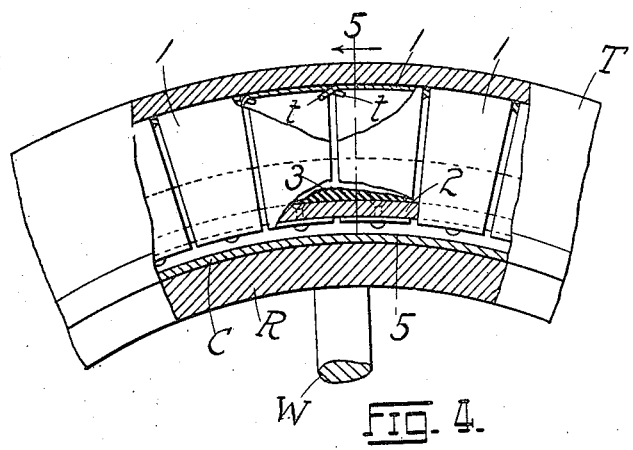
Figure 5:
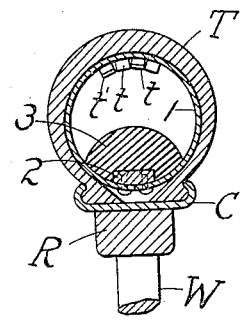

Figure 1 represents a side elevation of one-half of a vehicle wheel showing my invention applied thereto, parts being broken away; Fig. 2 is an edge view of the same with parts broken away; Fig. 3 is an enlarged edge view with the outer casing broken away to expose the inner metallic tubular filler, one of the sections thereof being broken to expose the annular band to which the ends of the sections are secured; Fig. 4 is a side elevation of the tire with the casing broken away to expose the metallic filler or tube; Fig. 5 is a cross-section through the tire and felly of the wheel on the line 5—5 of Fig. 4; Fig. 6 is a side elevation of a portion of a wheel and tire showing a modified form of clencher rim; Fig. 7 is a cross-section through the tire and felly of the modification shown in Fig. 6; and Fig. 8 is a development or flat view of three of the sections entering into the construction of the inner resilient filler tube, said view illustrating the manner of interlocking the tread portions of the sections, two of the sections being broken away.

Referring to the drawings, and for the present to Figs. 1 to 5 inclusive, and to Fig. 8, W, represents a conventional vehicle wheel provided with a felly R, a clencher rim C, and a tire casing T, as well understood in the art. In lieu of the usual inflatable inner sack or tube which, together with the outer casing T constitutes the conventional pneumatic tire of automobiles, I substitute a metallic, tubular, resilient articulated cushioning member made up of a series of blanks or sections 1 interlocked at points opposite the tread of the tire, these sections being of spring metal and of a form substantially as shown in Fig. 8. As shown in said figure the blank comprising a section is widest at the center and tapers toward each end, so that when the blanks are assembled and bent across the plane of rotation of the wheel to form a section of an annular tube, the sides of the consecutive sections will be substantially parallel, the said sides disposing themselves in radial planes (Fig. 4). Disposed on opposite sides of each blank 1, and on opposite sides of the transverse center line $x$ of the blank are tongues $t$, $t$, a second tongue $t'$ being formed on each side at a suitable distance from the tongue $t$, the tongues $t'$ of any blank being likewise on oposite sides of the center line $x$. In assembling the blanks or sections, a tongue $t$ of one section is inserted between the tongues $t$, $t'$, of an adjacent section, bringing the tongues $t$, $t$, of the several sections on opposite sides of but immediately adjacent to, the center line of the assembled sections (said center line being made up of the succession of lines $x$), the tongues $t'$, $t'$, being further removed from said center line, all the tongues however being symmetrically disposed about said line (Figs. 3 and 8). In assembling the sections or blanks 1, the tongues $t, t'$, of the several sections are caused to engage the inner faces of the sections, so that when the sections are bowed into tubular form all the tongues will point inwardly or toward the inside of the tube thus formed. The terminals of the blanks 1 are provided with rivet holes $o$, and as each blank is bent or bowed into tubular shape the ends thereof are riveted to the inner face of an annular band 2 encompassing the felly but detached therefrom, and confined within the casing T. To prevent possible collapse of the sections 1 when assembled and formed into a tube, I provide the band 2 with a buffer ring 3 of rubber or equivalent material. In practice the band 2 may have the rubber ring 3 molded or formed about it, or the ring may be slipped over the band before the tube sections 1 are secured to the band. In building up the resilient tube composed of the blanks 1, a blank is first bowed or bent and its ends secured to the band 2, after which the tongues $t, t'$, of the next blank are interlocked with the blank already in place and its ends secured to the band 2. The third blank is bent and interlocked with the second and so on through the entire series of blanks until the metal tube is completed. While it is true that the ends of the blanks or sections 1 are riveted to the band 2 and thereby fixed, the tongues $t, t'$, of successive sections have free play over adjacent sections, so that in effect the tongues bring about more or less of an articulation between the sections especially in the region of the tread portion of the tire. The inner tube composed of the sections 1 may therefore be said to be articulated or jointed; and since the individual sections are composed of spring or resilient metal, the resulting tube is decidedly resilient and forms a cushioning filler for the outer casing T, the resulting tire comparing favorably with a pneumatic tire in the matter of elasticity, and comfort to the occupant of the car.

In Figs. 6 and 7 the band to which the blanks 1 are secured is split in the plane of rotation of the wheel thereby resulting in two sections $2', 2'$. By splitting the band in the manner indicated it facilitates the attachment thereto of the blanks 1, as in some instances it might be desirable to insert the fingers into the tube; and this can be readily done by separating the sections $2', 2'$, sufficiently for that purpose. In this modification I show the clencher rim composed of two sections 10, 10, the same being supported on a felly ring 11 one edge of which is bent or flanged to engage the clench or lip of the adjacent clencher rim section. the opposite edge being provided at predetermined points with slots $s$ for the play of the terminal finger $h$ of a tightening bolt 12 traversing the felly R immediately inside the felly ring 11, the nut $n$ carried at the opposite end of the bolt bearing against an angle washer 13 engaging the felly and flange $d$ of the felly ring (Fig. 7). By loosening the nuts $n$ and removing the bolts 12, the clencher rim sections 10 or either of them may be slipped from the felly ring and the tire removed. The construction in Figs. 6 and 7 in other respects is not different from that shown in Figs. 1 to 5 inclusive and Fig. 8, and accordingly the same reference characters are used as were employed to designate the corresponding parts in the first form described.

As seen to best advantage in Figs. 3 and 4, the sections 1 composing the inner tube are spaced apart whereby each section under the varying loads to which it is subjected, may dilate and contract independently of an adjacent section, the tongues $t, t'$, however serving to unite the sections in such a way that the burden imposed on a section is shared by its neighbor, said tongues not only allowing for circumferential play among the several sections, but serving to articulate the tube in such a way that one section is free to oscillate about an adjacent section. The tongues may be said to form hinge connections between the sections. Under a heavy load or an excessive jar the articulated tube may flatten to the point of engaging the buffer ring 3, this ring being merely a precautionary measure against an undue flattening of the springs 1 or a flattening beyond their elastic limit, which if exceeded would destroy the further usefulness of the spring. For exceptionally light loads however the buffer 3 is not necessary. I may of course depart from the details here shown without in any wise affecting the nature or spirit of my invention.

Having described my invention what I claim is:

1. A vehicle wheel tire comprising an outer casing and an inner articulated tubular cushioning member composed of a series of sections, an annular band to which the ends of the sections are secured, and a buffer interposed between the band and the sections of the cushioning member, the buffer being recessed to receive the band aforesaid.

2. In a vehicle wheel tire, a hollow cushioning member comprising a series of interlocked sections bowed across the plane of rotation of the wheel, an annular band for securing the ends of the sections, each section being provided on its opposite edges opposite the tread of the tire with a plurality of tongues spaced apart, a tongue of one section being inserted through a space adjacent the tongues of the opposite section, the tongues being disposed on the inside of the hollow tubular member thus formed and forming hinge connections between the sections.

3. In combination with a wheel provided with a felly and a felly ring, a casing on the felly ring, a tubular cushioning member in the casing composed of a series of bowed sections hinged to one another and yielding in planes parallel to the plane of rotation of the wheel, an annular band surrounding but disconnected from the felly ring to which the ends of the bowed sections are secured.

In testimony whereof I affix my signature, in presence of two witnesses.

DAVID MILLAR.

Witnesses:
EMIL STAREK,
JOS. A. MICHEL.

Copies of this patent may be obtained for five cents each, by addressing the "Commissioner of Patents, Washington, D. C."